United States Patent [19]
Palmer

[11] Patent Number: 6,048,456
[45] Date of Patent: Apr. 11, 2000

[54] WATER FILTER HOUSING

[75] Inventor: David G. Palmer, Lincoln, Nebr.

[73] Assignee: Palmer Technologies, Inc., Lincoln, Nebr.

[21] Appl. No.: 08/871,298

[22] Filed: Jun. 9, 1997

Related U.S. Application Data

[63] Continuation-in-part of application No. 08/609,658, Mar. 1, 1996, abandoned.

[51] Int. Cl.[7] .................................................... B01D 27/08
[52] U.S. Cl. .......................... 210/282; 156/69; 210/289; 264/DIG. 48
[58] Field of Search ..................................... 210/189, 232, 210/266, 282, 289; 29/402.18; 156/69, 293; 264/DIG. 48

[56] References Cited

U.S. PATENT DOCUMENTS

| | | | |
|---|---|---|---|
| 3,267,193 | 8/1966 | Havelka | 210/266 |
| 4,155,849 | 5/1979 | Baierl | 210/266 |
| 4,368,123 | 1/1983 | Stanley | 210/269 |
| 4,460,465 | 7/1984 | Zacharkow et al. | 210/266 |
| 5,035,798 | 7/1991 | Stenger | 210/232 |
| 5,078,874 | 1/1992 | Sullivan | 210/286 |
| 5,108,599 | 4/1992 | Lowery | 210/232 |
| 5,271,837 | 12/1993 | Discepolo et al. | 210/282 |
| 5,277,805 | 1/1994 | Ferguson | 210/266 |

*Primary Examiner*—Ivars Cintins
*Attorney, Agent, or Firm*—Van Dyke, Gardner, Linn & Burkhart, LLP

[57] ABSTRACT

A method of manufacturing and remanufacturing a water treatment device having a media bed includes assembling a housing from a length of open pipe and a pair of end caps. One end cap is secured to each open end of the pipe. At lease two openings are formed at opposite ends of the housing. The housing is charged with media by passing the media through the openings in the housing. A pair of screens are provided in the housing outwardly of the media, and a pair of fittings are provided in the openings outwardly of the screens. The end caps may be permanently secured to the pipe, such as by an adhesive or other known techniques, prior to charging the housing with media. The water treatment device may be charged with media by forming a slurry, made up of the media and a liquid, and passing the slurry through the opening in the pipe. Liquid may then be drawn out of the housing through one of the fittings. At least one of the end caps may include a wall portion which overlaps a portion of the pipe. The opening is formed through overlapping portions of the end cap and pipe.

46 Claims, 6 Drawing Sheets

WATER FILTER HOUSING

CROSS-REFERENCE TO RELATED APPLICATIONS

This application is a continuation-in-part of application Ser. No. 08/609,658 filed Mar. 1, 1996, now abandoned.

BACKGROUND OF THE INVENTION

This invention relates generally to a method of manufacturing a water treatment device, remanufacturing a water treatment device, and a water treatment device made according to such methods. More particularly, the invention relates to a method of manufacturing and remanufacturing a water treatment device having a media bed in a housing made from a length of open pipe, a pair of end caps secured one to each opening of the pipe, a pair of screens at each open end of the pipe outwardly of the media, and fittings penetrating each end cap outwardly of the associated screen.

Water is often treated by passing it through a bed of suitable media. This may be a cation exchange resin, such as that used to soften hard water by exchanging sodium ions for calcium and magnesium ions present in the water. The media may alternatively be a granular-activated carbon for the removal of chlorine and other volatile organic compounds from drinking water. One common form of housing used to contain the media is made from a cut length of extruded plastic pipe, such as PVC, with end caps permanently attached over the open ends. Restraining disks are fitted within the end caps on support members over the openings in order to retain the media, but pass water. This approach provides for an inexpensive housing which is especially useful for media volumes ranging from approximately 50 cubic inches up to approximately 300 cubic inches. The restraining disks are typically made from a pad of filtering materials, such as porous plastic sold under the trademark Porex, or a fine mesh screen or a combination of these. Inlet and outlet fittings are inserted in the end caps outwardly of the restraining disks. Such inlet and outlet fittings may be attached by drilling and tapping the housing and then screwing in standard male pipe fittings to which tubing, or the like, may be attached.

Such known water treatment devices are made by first fixing one end cap which supports one restraining disk to an open end of the pipe typically by using an adhesive, such as a solvent glue. The treatment media is then added into the pipe and the other end cap and restraining disk are fixed in place using similar techniques.

One disadvantage of this known technique is that solvent glues are cured in the presence of the treatment media. As the solvent adhesive dries, organic fumes are given off which can be absorbed by the treatment media. The organic substances may then be released back into the water during initial use of the treatment device. This may, at least temporarily, decrease rather than increase the quality of the water consumed.

A second disadvantage of known devices is that the treatment media cannot be replaced. Such treatment media has a limited life and must be discarded when spent. Once the media is spent, the known treatment devices must be discarded in their entirety. This results in non-degradable plastic containers being dumped in landfills, even though the housing is still in excellent condition.

The present invention provides a method of manufacturing a water treatment device which allows media to be replaced after it has been spent. The present invention further provides a method for remanufacturing a water treatment device in order to replace the spent media. The invention further provides a water treatment device that is made according to such methods.

SUMMARY OF THE INVENTION

A method of manufacturing and remanufacturing a water treatment device having a media bed includes assembling a housing from a length of open pipe and a pair of end caps. One end cap is secured to each open end of the pipe. Openings are formed at opposite ends of the housing. A pair of screens are provided outwardly of the media and a pair of fittings are provided outwardly of the screens in the openings. The housing is charged with media by passing the media through one of the openings in the pipe.

According to an aspect of the invention, the end caps are permanently joined with the pipe prior to charging the housing with media. If the end caps are secured to the pipe by an adhesive, such as a solvent glue, the adhesive is allowed to cure prior to charging the housing with media. This substantially avoids the absorption by the treatment media of organic fumes given off by the adhesive. According to another aspect of the invention, the water treatment device may be charged with media by forming a slurry, made up of the media and a liquid, and passing the slurry through one of the openings in the pipe. Liquid may be drawn out of the housing through another one of the openings. According to yet another aspect of the invention, at least one of the end caps includes a wall portion which overlaps a portion of the pipe. At least one of the openings is formed through overlapping portions of the end cap and pipe. In this manner, the fitting or plug in this opening engages a double wall thickness which provides more secure engagement. After a water treatment device that is manufactured according to such method is used, the spent media may be replaced by withdrawing the spent media from the housing, and charging the housing with fresh media. The housing may then be recharged by passing the fresh media through one of the openings in the housing.

According to another aspect of the invention, a conventional water treatment device may be remanufactured as follows. Such conventional spent water treatment device includes a housing and spent media in the housing. The housing is made from a length of open pipe, a pair of end caps, a pair of restraining disks, and a pair of fittings. One restraining disk and end cap is positioned at each opening, and one fitting is penetrating each end cap outward of the associated restraining disk. According to this aspect of the invention, an opening is formed in the pipe between the restraining disks. The spent media is removed from the housing through the opening in the pipe. The housing is charged with fresh media by passing the fresh media through the opening in the pipe. The opening in the pipe is closed with a plug. This aspect of the invention allows conventional water treatment devices, which have been discarded to landfill, to be retrieved from the landfill and remanufactured for reuse. In this manner, the present invention not only significantly reduces the amount of non-degradable materials being sent to landfills but also allows some non-degradable materials to be retrieved from landfills and reused.

These and other objects, advantages, and features of this invention will become apparent upon review of the following specification in conjunction with the drawings.

DESCRIPTION OF THE PREFERRED EMBODIMENT

Figure 1:
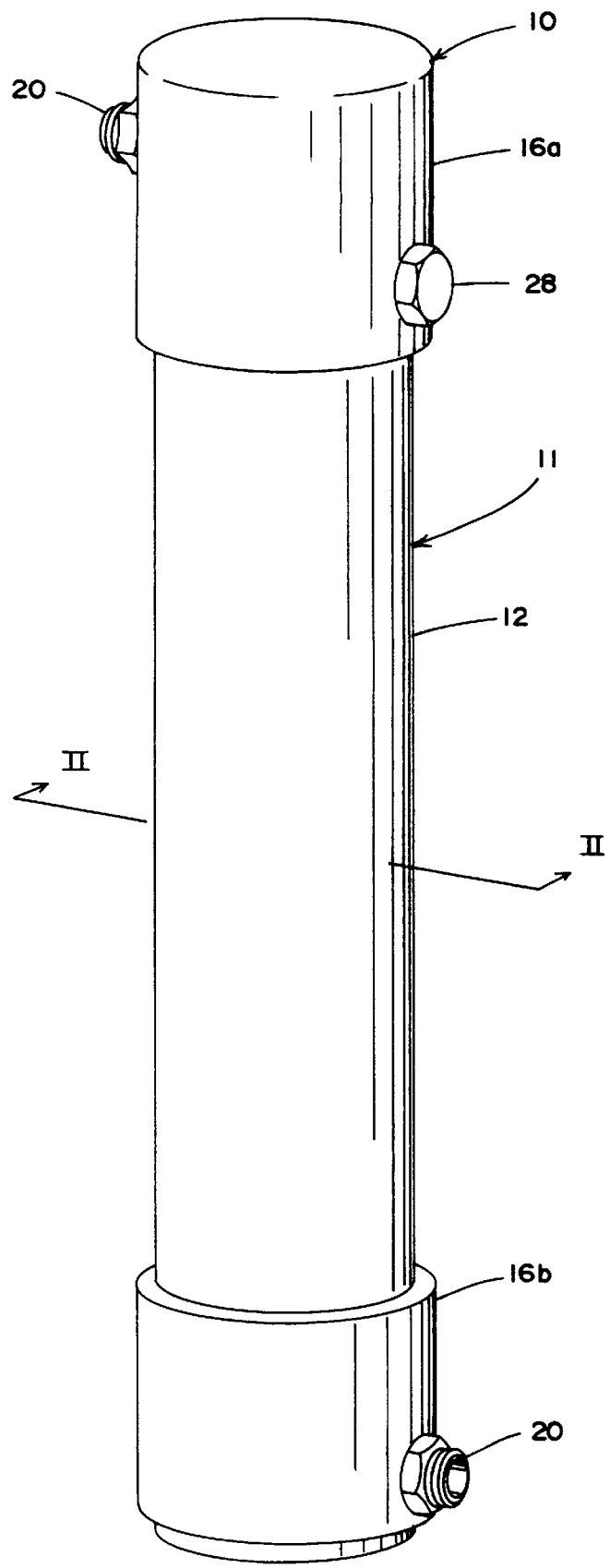
FIG. 1 is a perspective view of a water treatment device, according to the invention.

Referring now specifically to the drawings and the illustrative embodiments depicted therein, a water treatment device 10 manufactured according to the invention includes a housing 11 made up of an open section of pipe 12, a restraining device or screen 14 at opposite ends of housing 11, and caps 16a and 16b covering each open end of pipe 12. Each cap 16a, 16b includes a plurality of support members 18 which support the associated restraining device 14 while allowing passage of liquid through the restraining device. Each cap 16a, 16b further includes an inlet or outlet fitting 20 which penetrates wall 22 of the respective cap in order to provide fluid communication with an interior compartment 13 of housing 11.

Each cap 16a, 16b includes a wall portion 24 which overlaps pipe 12. In the illustrated embodiment, caps 16a, 16b are permanently affixed to pipe 12 utilizing an adhesive, such as a solvent glue. Other forms of permanent attachment, such as by sonic welding between the pipe and caps, and other known techniques, may be utilized.

Figure 2:
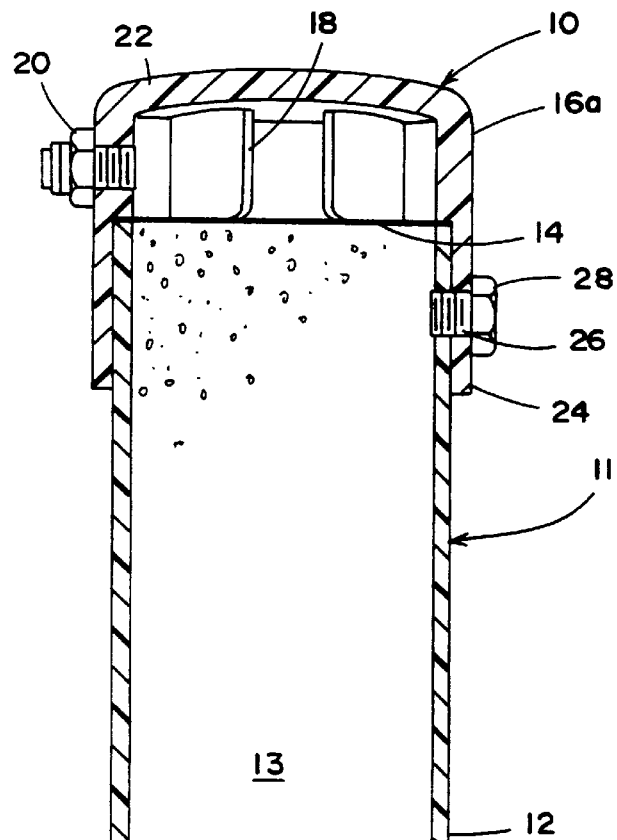
FIG. 2 is a sectional view taken along the lines II—II in FIG. 1.
Figure 2:
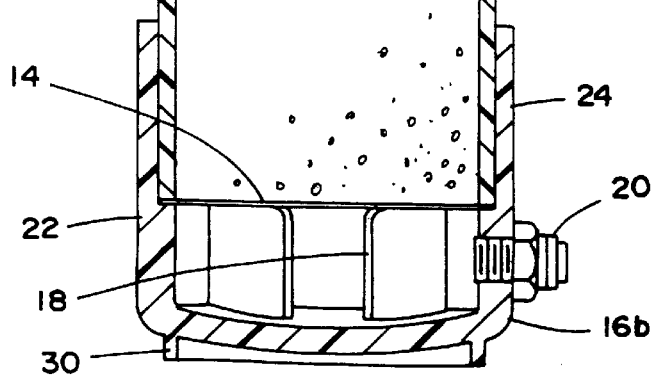
Figure 5:
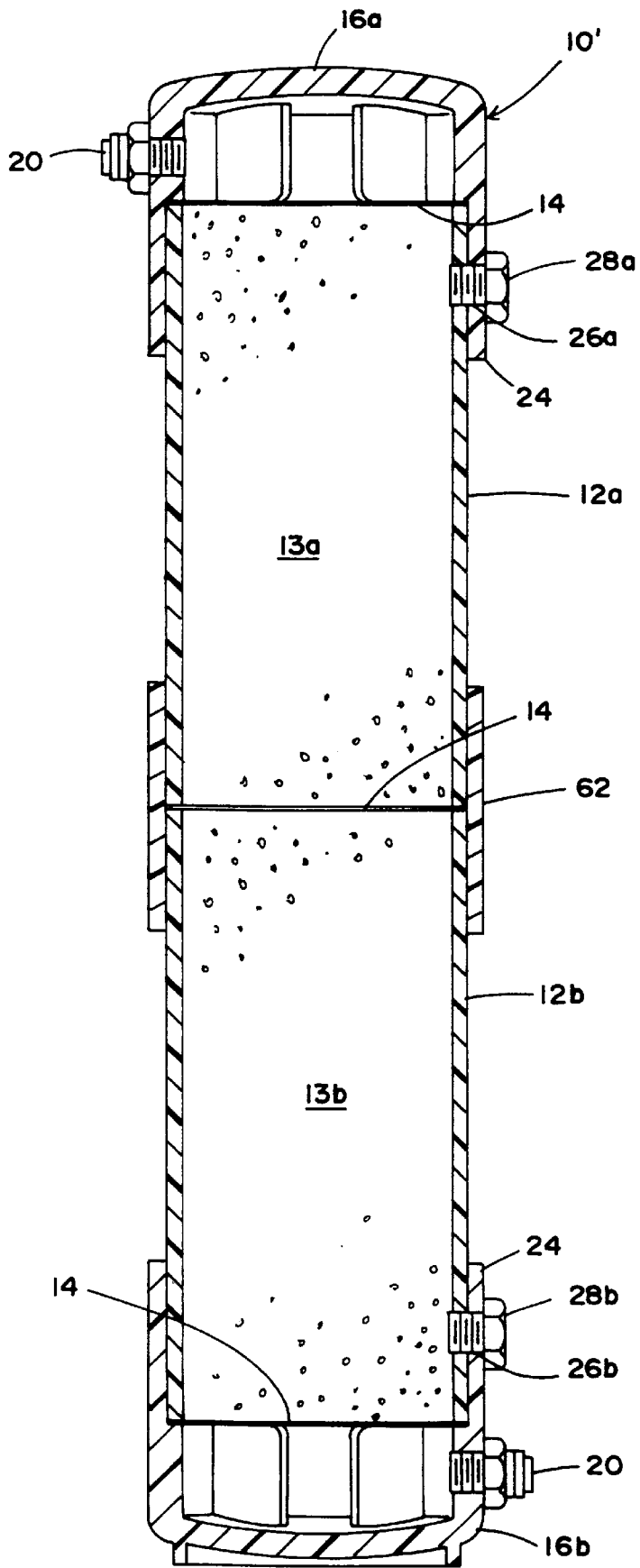
FIG. 5 is the same view as FIG. 2 of an alternative embodiment.

In the embodiment illustrated in FIGS. 1, 2, and 5, a through opening 26 is formed into the interior of compartment 13 of housing 11. Opening 26 is internally threaded and closed by a threaded plug 28. In the illustrated embodiment, threaded opening 26 passes through wall portion 24 of cap 16a, 16b and the wall of pipe 12. This provides additional strength to the seal of opening 26 provided by plug 28. However, it would be possible to place opening 26 only through the wall of pipe 12 if the interior of housing 11 will not be exposed to water mains pressure.

In the illustrated embodiment, pipe 12 is three-inch PVC schedule 40 pipe. Caps 16a, 16b are also made from PVC and are commercially available from various sources. Cap 16b includes a rim 30 in order to allow housing 11 to stand upright. Opening 26 is a $^{45}\!/_{64}$-inch hole, which is drilled approximately one inch from the end of pipe 12, and is tapped with a one-half inch N.P.T. pipe thread. Such structure has been found to provide integrity to housing 11 with respect to the water pressure within compartment 13 should water treatment device 10 be connected with mains pressure. Alternatively, if the water treatment device is utilized as a countertop drinking water treatment device with an open discharge that cannot be subject to mains pressure, threaded plug 28 and opening 26 may be replaced by a push-in-type seal which provides sufficient sealing of housing 11. Such seal may conveniently be placed through the single wall thickness of pipe 12 without requiring the double wall thickness provided by the addition of wall portion 24.

Compartment 13 is filled with a water treatment media in order to make a media bed. This media may be a cation exchange resin as is used to soften hard water by exchanging sodium ions for calcium and magnesium ions present in the water. Alternatively, media 13 may be a granular-activated carbon for removing chlorine and other volatile organic compounds from drinking water.

Figure 3:
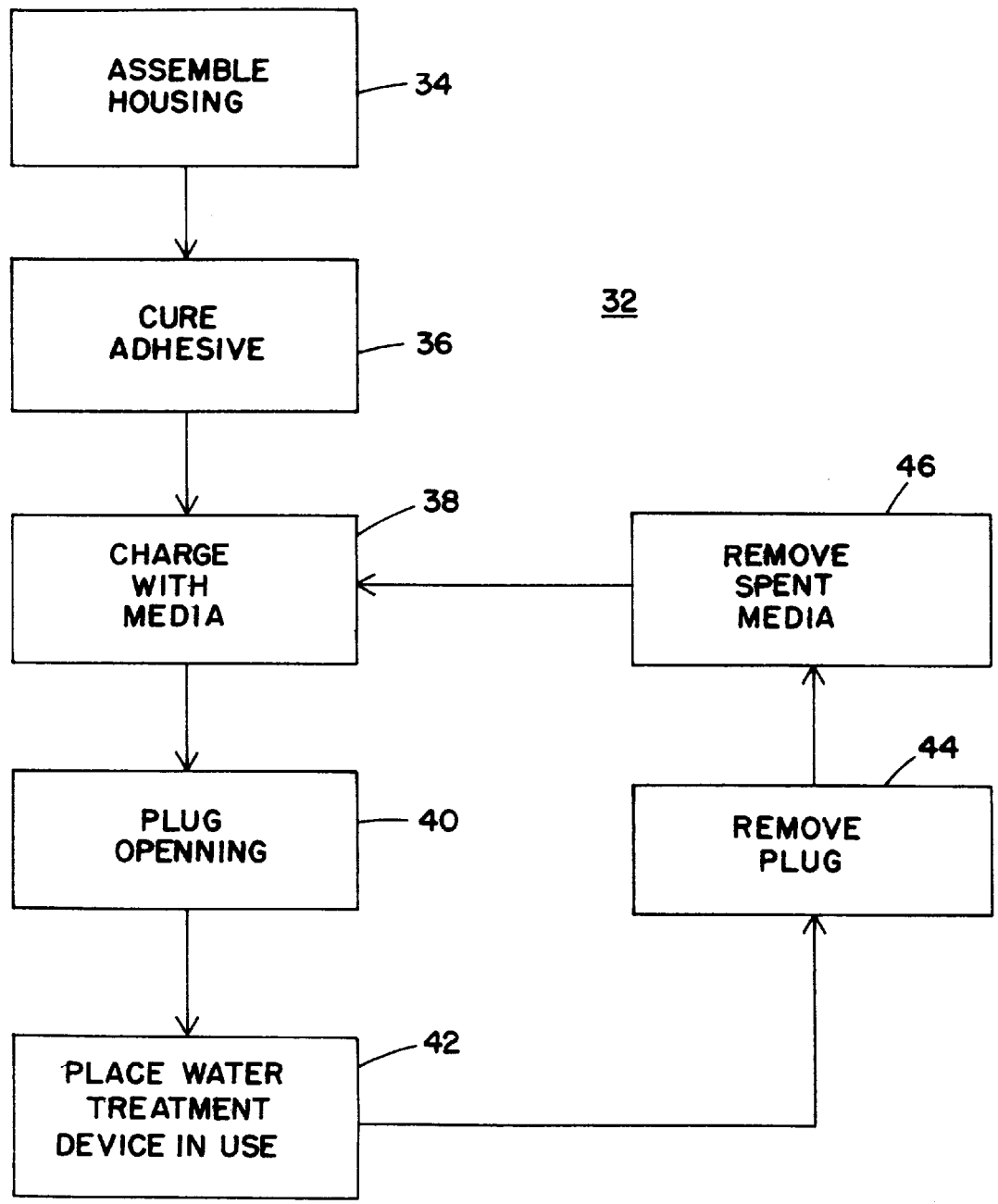
FIG. 3 is a flowchart of a method of manufacturing and remanufacturing a water treatment device, according to the invention.

Water treatment device 10 is manufactured and remanufactured utilizing a method 32 (FIG. 3). Method 32 begins by assembling housing 11 by drilling and tapping openings in caps 16a, 16b. At lease one of the screens or restraining devices 14 is positioned in the housing. In the embodiment illustrated in FIGS. 1, 2, and 5, restraining devices 14 are positioned over the open ends of pipe 12, caps 16a, 16b affix to pipe 12 in a manner that the restraining devices are supported by support members 18, and opening 26 is formed in housing 11. If housing 11 is assembled utilizing adhesive, such as a solvent glue, the glue adhesive is cured at 36 in order to discharge solvent vapors. Housing 11 is then charged with media at 38. Media can be added through opening 26 in either dry form or as a slurry. In dry form, vibration or air pressure/suction may be applied to help move the granular material. By mixing the media with a liquid, such as water, a slurry may be formed which is poured into housing 11 through an opening not covered by a screen, such as opening 26. The slurry carries the media into the housing and the liquid passes through the restraining disk or disks and out of the housing through another opening. This may be accomplished either by gravity or may be assisted by applying suction to a fitting 20. In the embodiment illustrated in FIGS. 1, 2, and 5, once the housing is charged with media, opening 26 is plugged with plug 28 at 40 by threading the plug into the tapped opening 26. Fittings 20 may be applied at a convenient time.

After the water treatment device is in use (42) for a sufficient time to spend the media, the water treatment device is removed from service and refurbished as follows. Plug 28 is removed at 44, and the spent media is removed through opening 26 at 46. After any necessary cleaning of the housing, the housing may then be recharged with media at 38 in a manner previously described. Plug 28 is inserted in opening 26 at 40, and the remanufactured water treatment device is placed back into service at 42.

Figure 4:
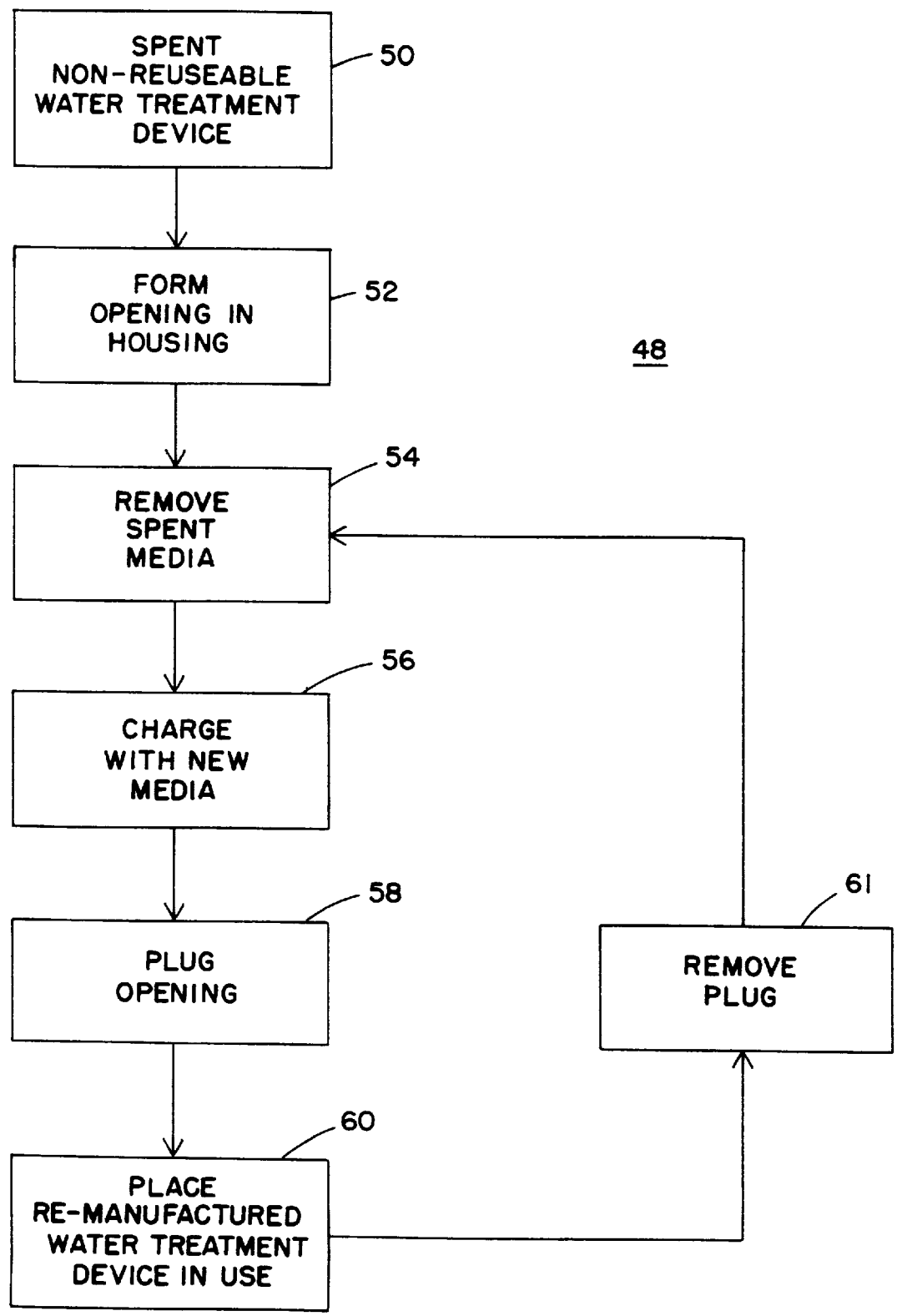
FIG. 4 is a flowchart of a method of remanufacturing a conventional water treatment device, according to the invention.

The invention may also be applied to remanufacturing conventional water treatment devices utilizing a method 48 (FIG. 4). According to this method, the non-reusable water treatment device is removed from service at 50, or retrieved from a landfill, and an opening 26 drilled and tapped in a sidewall of housing 11 at 52. The spent media is removed at 54 and, after suitable cleaning and the like, the housing is charged with fresh media at 56. Opening 26 is plugged with a plug 28 at 58, and the remanufactured water treatment device is placed back into service at 60. When the media in the remanufactured device becomes spent, the device is removed from service, plug 28 is removed at 61, and the spent media is replaced (54, 56, 58, 60).

An alternative water treatment device 10' may be manufactured and remanufactured according to the invention (FIG. 5). Water treatment device 10' includes two compartments 13a, 13b separated by a third restraining device 14. Each compartment 13a, 13b is intended to hold a different type of media although the same media could be placed in both compartments, if desired. The additional restraining device is positioned between the ends of pipe sections 12a, 12b which are joined with an annular coupling 62. A first opening 26a is formed through wall portion 24 of cap 16a and the wall of pipe 12a. A second opening 26b is formed through wall portion 24 of plug 16b and the sidewall of pipe 12b. In this manner, media may be added to compartment 13a through opening 26a and media may be added to compartment 13b through opening 26b. After the media is inserted in compartments 13a and 13b, in this manner, plugs 28a and 28b are inserted into respective openings 26a and 26b in order to complete the assembly of water treatment device 10'.

Figure 6:
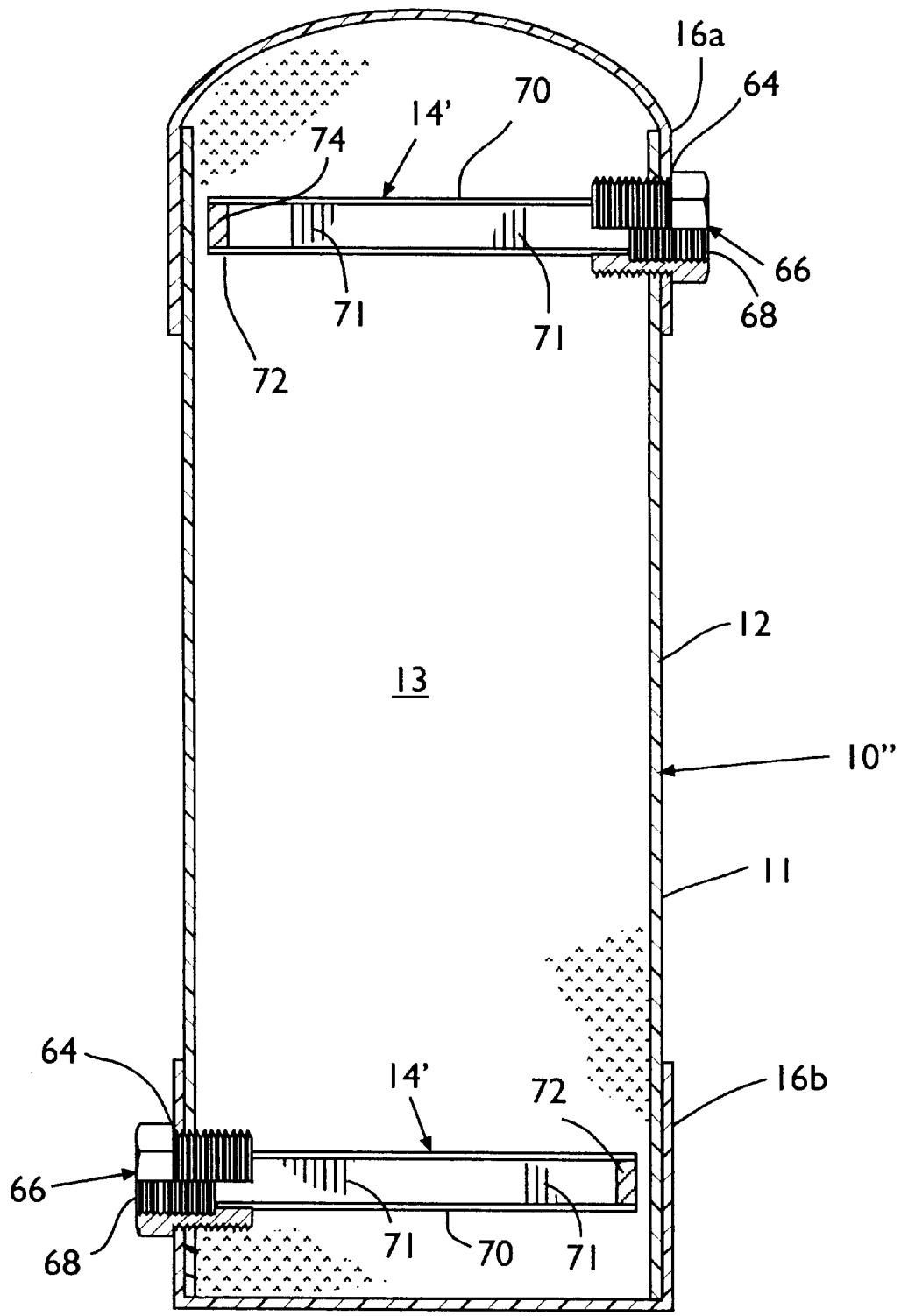
FIG. 6 is the same view as FIG. 2 of another alternative embodiment.

Another alternative water treatment device 10" includes a housing 11" having first and second end caps 16a and 16b permanently joined with a pipe 12, such as by an adhesive or other known technique (FIG. 6). A pair of openings 64 are formed in overlapping portions of the walls of each end cap 16a, 16b and pipe 12. An inlet/outlet fitting 66 is threadably engaged with each opening 64. Each fitting 66 includes internal thread 68 in order to provide threadable engagement with suitable fittings of the water system (not shown). A pair of screens 14' are each joined with a fitting 66 such that the screen along with the fitting is inserted in the respective opening 64. Each screen 14" is made of a slotted tubular member 70 sized to fit within the inner diameter of fitting 66 and having a length which terminates at an end 72 close to the inner surface of pipe 12. A plug 74 at end 72 is thereby restrained from being forced out of tubular member 70 by the surface of pipe 12. This close spacing also retains the tubular member in the fitting. In the illustrated embodiment, tubular member 70 is a slotted distributor of the type marketed by Matt-Son of Michigan. However, other foraminous surfaces could be utilized such as tubular screens, or meshes, or the like.

In order to manufacture water treatment device 10", housing 11" is manufactured by permanently assembling end caps 16a and 16b to pipe 12 and forming openings 64. After any adhesive is cured, one of the screens 14' is inserted in the housing along with its associated fitting 66. The media is inserted in the housing through the other opening 64 and withdrawn through the opening fitted with one of the screens 14' utilizing techniques previously described. After the housing is charged with media, the other screen 14' is inserted in the housing along with its associated fitting 68. In this manner, it can be seen that the water treatment device illustrated in FIG. 6 is easier to manufacture and requires fewer components and openings in the housing. Furthermore, the end caps are of a design which is more commonly available and do not require supports for the restraining device or screen.

In the illustrated embodiment, tubular member 72 is a 0.6 inch diameter PVC tube which is slotted on opposite sides with slots 71 which are about 1/16 inches apart and having a width in the range of from about 0.005 inches to about 0.010 inches. Pipe 12 and end caps 16a, 16b are preferably manufactured from PVC. End caps 16a, 16b are joined with pipe 12 by a PVC solvent cement although other techniques may be used, such as sonic welding or other known methods of permanently joining the members together. Fitting 66, in the illustrated embodiment, is a standard brass hex bushing having a one-half inch female pipe thread and a one-quarter inch internal threaded opening.

Thus, it is seen that the present invention provides a superior water treatment device by allowing the housing to be fully manufactured and cured prior to inserting the media. In this manner, no volatile organic fumes need be brought into contact with the media during manufacturing of the water treatment device. Furthermore, a water treatment device is provided that is capable of remanufacturing in order to avoid the necessity of discarding the housing to a landfill because the media is spent. Importantly, the principles of the invention may be applied to existing, non-recyclable, water treatment devices in order to remanufacture such existing water treatment devices and, thereby, further reduce the space taken up in the landfill by such non-degradable containers.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A method of manufacturing a water treatment device having a water treatment media bed of the type that can be contaminated by volatile vapors, including:

assembling a housing from a length of open pipe and a pair of end caps, said assembling including securing one said end cap over each open end of said pipe using an adhesive of the type that releases volatile vapors during curing and forming at least two openings at opposite ends of said housing;

curing said adhesive;

after said adhesive is cured, charging said housing with a water treatment media of the type that can be contaminated with volatile vapors by passing said water treatment media through one of said openings wherein said adhesive is cured without substantially contaminating said water treatment media with volatile vapors;

providing a pair of screens in said housing, wherein said screens are outwardly of said water treatment media when said screens and said water treatment media are in said housing; and providing a pair of fittings outwardly of said screens in said at least two openings.

2. The method of manufacturing a water treatment device according to claim 1 wherein said adhesive comprises a solvent adhesive that gives off organic volatile vapors during curing.

3. The method of manufacturing a water treatment device in claim 1 wherein at least one of said pair of screens is inserted in said housing through at least one of said at least two openings after said step of charging.

4. The method of manufacturing a water treatment device in claim 3 further including removing at least one of said pair of screens from the associated one of said openings, charging said housing with fresh water treatment media by passing said fresh water treatment media through said associated one of said openings and reinserting said at least one of said pair of screens in said associated one of said openings.

5. The method of manufacturing a water treatment device in claim 1 wherein each of said screens is coupled with one of said fittings.

6. The method of manufacturing a water treatment device in claim 5 wherein each of said screens is an elongated tubular wall defining a multiplicity of openings in said wall.

7. The method of manufacturing a water treatment device in claim 6 wherein each of said screens includes a plug at an end of said wall.

8. The method of manufacturing a water treatment device in claim 7 wherein said end of said wall is positioned adjacent an inner surface of said housing restraining said plug in said wall.

9. The method of manufacturing a water treatment device in claim 1 wherein said pair of screens are provided in said housing prior to charging and wherein said forming at least two openings includes forming a third opening between said pair of screens and wherein said step of charging includes passing said water treatment media through said third opening and closing said third opening with a plug.

10. The method of manufacturing a water treatment device according to claim 9 further including removing said plug from said opening, removing said water treatment media from said housing, charging said housing with fresh water treatment media by passing said fresh water treatment media through said opening in said pipe and reclosing said opening in said pipe with a plug.

11. The method of manufacturing a water treatment device according to claim 9 including providing a third screen, positioning said third screen in said pipe between said pair of screens, wherein said forming at least two openings includes forming a fourth opening in said pipe between said pair of screens on an opposite side of said third screen from said third opening and wherein said charging includes passing water treatment media through said third opening and said fourth opening and closing said third and fourth openings with plugs.

12. The method of manufacturing a water treatment device according to claim 9 wherein said screens are made from porous plastic material or fine wire mesh.

13. A method of manufacturing a water treatment device having a water treatment media bed, including:
assembling a housing from a length of open plastic pipe and a pair of plastic end caps, said assembling including securing one said end cap over each open end of said pipe and forming at least two openings at opposite ends of said housing;
charging said housing with water treatment media by passing said water treatment media through one of said openings;
providing a pair of screens in said housing, wherein said screens arc outwardly of said water treatment media when said screens and said water treatment media are in said housing; and
providing a pair of fittings outwardly of said screens in said at least two openings;
wherein at least one of said end caps includes a wall portion which overlaps a portion of said pipe and wherein said forming at least two openings includes forming at least one of said openings through overlapping portions of said at least one of said end caps and said pipe and further wherein said providing a pair of fittings includes supporting at least one of said fittings in said at least one of said openings by both of said overlapping portions, thereby providing sufficient strength to withstand water main pressure level.

14. The method of manufacturing a water treatment device in claim 13 wherein at least one of said pair of screens is inserted in said housing through at least one of said at least two openings after said charging.

15. The method of manufacturing a water treatment device in claim 14 further including removing at least one of said pair of screens from the associated one of said openings, charging said housing with fresh water treatment media by passing said fresh water treatment media through said associated one of said openings and reinserting said at least one of said pair of screens in said associated one of said openings.

16. The method of manufacturing a water treatment device in claim 15 wherein each of said screens is coupled with one of said fittings.

17. The method of manufacturing a water treatment device in claim 16 wherein each of said screens is an elongated tubular wall defining a multiplicity of openings in said wall.

18. The method of manufacturing a water treatment device in claim 17 wherein each of said screens includes a plug at an end of said wall.

19. The method of manufacturing a water treatment device in claim 18 wherein said end of said wall is positioned adjacent an inner surface of said housing restraining said plug in said wall.

20. A water treatment device made according to the method in claim 16.

21. The method of manufacturing a water treatment device in claim 13 wherein said pair of screens arc provided in said housing prior to said step of charging and wherein said forming at least two openings includes forming a third opening between said pair of screens and wherein said step of charging includes passing said water treatment media through said third opening and closing said third opening with a plug.

22. The method of manufacturing a water treatment device according to claim 21 further including removing said plug from said opening, removing said water treatment media from said housing, charging said housing with fresh water treatment media by passing said fresh water treatment media through said opening in said pipe and reclosing said opening in said pipe with a plug.

23. The method of manufacturing a water treatment device according to claim 21 including providing a third screen, positioning said third screen in said pipe between said pair of screens, wherein said forming at least two openings includes forming a fourth opening in said pipe between said pair of screens on an opposite side of said third screen from said third opening and wherein said charging includes passing water treatment media through said third opening and said fourth opening and closing said third and fourth openings with plugs.

24. The method of manufacturing a water treatment device according to claim 21 wherein said screens are made from porous plastic material or fine wire mesh.

25. A water treatment device made according to the method in claim 21.

26. A water treatment device made according to the method in claim 13.

27. A method of manufacturing a water treatment device having a water treatment media bed, including:
assembling a housing from a length of open pipe and a pair of end caps, said assembling including securing one said end cap over each open end of said pipe and forming at least one opening at a end of said housing;
charging said housing with water treatment media by passing said water treatment media through said at least one opening; and
after said charging, inserting a screen in said at least one opening and forming a fitting in said at least one opening, said fitting adapted to be connected with a water system.

28. The method of manufacturing a water treatment device in claim 27 including forming at least two openings at opposite ends of said housing and inserting a pair of screens in said housing through said at least two openings after said step of charging.

29. The method of manufacturing a water treatment device in claim 28 further including removing at least one of said pair of screens from the associated one of said openings, charging said housing with fresh water treatment media by passing said fresh water treatment media through said associated one of said openings and reinserting said at least one of said pair of screens in said associated one of said openings.

30. The method of manufacturing a water treatment device in claim 27 wherein said screen is coupled with said fitting.

31. The method of manufacturing a water treatment device according to claim 27 wherein said water treatment media is selected from the group consisting of a cation exchange resin and a granular activated carbon.

32. The method of manufacturing a water treatment device in claim 27 wherein said fitting has an outer surface joining said housing and a threaded inner surface, said threaded inner surface adapted to be connected with a water system.

33. The method of manufacturing a water treatment device in claim 32 wherein said fitting outer surface is threaded for threadably joining said housing.

34. The method of manufacturing a water treatment device in claim 33 wherein said screen is dimensioned to be positioned against a portion of said housing opposite said at least one opening by said fitting in said at least one opening.

35. A water treatment device made according to the method in claim 34.

36. The method of manufacturing a water treatment device in claim 27 wherein said screen is dimensioned to be positioned against a portion of said housing opposite said at least one opening by said fitting in said at least one opening.

37. A method of remanufacturing a water treatment device having a water treatment media bed, including:

providing a spent water treatment device including a housing and spent water treatment media in said housing, said housing made from a length of open pipe, a pair of end caps, a pair of restraining disks, and a pair of fittings wherein one said end cap and one said restraining disk are secured to each open end of said pipe and one said fitting is penetrating each said end cap outwardly of the associated restraining disk;

forming an opening in said pipe between said restraining disks, said forming being performed with spent water treatment media in said housing;

removing the spent water treatment media from said housing through said opening in said pipe;

charging said housing with fresh water treatment media by passing said fresh water treatment media through said opening in said pipe; and closing said opening in said pipe with a plug.

38. The method of remanufacturing a water treatment device according to claim 37 wherein said water treatment media is selected from the group consisting of a cation exchange resin and a granular activated carbon.

39. The method of remanufacturing a water treatment device according to claim 37 wherein said housing includes a third restraining disk positioned in said pipe between said pair of restraining disks and said water treatment device includes spent water treatment media on opposite sides of said third restraining disk and wherein said method further includes forming another opening in said pipe between said pair of restraining disks on an opposite side of said third restraining disk from said opening, wherein said removing includes removing spent water treatment media through both said opening and said another opening and wherein said charging includes passing two different types of water treatment media through said opening and said another opening and wherein said closing includes closing both said openings with plugs.

40. The method of remanufacturing a water treatment device according to claim 37 further including removing said plug from said opening, removing spent water treatment media from said housing after said fresh water treatment media has become spent, charging said housing with new fresh water treatment media by passing said new fresh water treatment media through said opening in said pipe, and reclosing said opening in said pipe with a plug.

41. A method of remanufacturing a water treatment device having a water treatment media bed, including:

providing a spent water treatment device including a housing and spent water treatment media in said housing, said housing made from a length of open plastic pipe, a pair of plastic end caps, a pair of restraining disks, and a pair of fittings wherein one said end cap and one said restraining disk are secured to each open end of said pipe and one said fitting is penetrating each said end cap outwardly of the associated restraining disk;

forming an opening in said pipe between said restraining disks;

removing the spent water treatment media from said housing through said opening in said pipe;

charging said housing with fresh water treatment media by passing said fresh water treatment media through said opening in said pipe; and closing said opening in said pipe with a plug;

wherein at least one of said end caps includes a wall portion which overlaps a portion of said pipe and wherein said forming an opening includes forming said opening through overlapping portions of said at least one of said end caps and said pipe and further wherein said closing said opening in said pipe with a plug includes supporting said plug with said overlapping portions, thereby providing sufficient strength to withstand water main pressure level.

42. The method of remanufacturing a water treatment device according to claim 41 wherein said water treatment media is selected from the group consisting of a cation exchange resin and a granular activated carbon.

43. The method of remanufacturing a water treatment device according to claim 41 wherein said housing includes a third restraining disk positioned in said pipe between said pair of restraining disks and said water treatment device includes spent water treatment media on opposite sides of said third restraining disk and wherein said method further includes forming another opening in said pipe between said pair of restraining disks on an opposite side of said third restraining disk from said opening, wherein said removing includes removing spent water treatment media through both said opening and said another opening and wherein said charging includes passing two different types of water treatment media through said opening and said another opening and wherein said closing includes closing both said openings with plugs.

44. A water treatment device made according to the method in claim 43.

45. The method of remanufacturing a water treatment device according to claim 41 further including removing said plug from said opening, removing spent water treatment media from said housing after said fresh water treatment media has become spent, charging said housing with new fresh water treatment media by passing said new fresh water treatment media through said opening in said pipe, and reclosing said opening in said pipe with a plug.

46. A water treatment device made according to the method in claim 41.

* * * * *

UNITED STATES PATENT AND TRADEMARK OFFICE
CERTIFICATE OF CORRECTION

PATENT NO.   : 6,048,456
DATED        : April 11, 2000
INVENTOR(S)  : David G. Palmer It is certified that error appears in the above-identified patent and that said Letters Patent is hereby corrected as shown below:

Column 7, line 34:
    "arc" should be --are--
Column 8, line 11:
    "arc" should be --are--

Signed and Sealed this

Twenty-fourth Day of April, 2001

Attest:

NICHOLAS P. GODICI

Attesting Officer     Acting Director of the United States Patent and Trademark Office